United States Patent [19]

Slevinsky

[11] Patent Number: 5,289,110
[45] Date of Patent: Feb. 22, 1994

[54] INPUT CURRENT RESPONSIVE, TAP CHANGING TRANSFORMER SYSTEM

[75] Inventor: John A. Slevinsky, West Hartford, Conn.

[73] Assignee: Cooper Industries, Houston, Tex.

[21] Appl. No.: 960,827

[22] Filed: Oct. 14, 1992

[51] Int. Cl.[5] .............................. G05F 5/04
[52] U.S. Cl. .................. 323/301; 315/279; 323/343
[58] Field of Search .......... 323/301, 302, 258, 343; 315/279; G05F 5/04

[56] References Cited

U.S. PATENT DOCUMENTS 3,743,921 7/1973 Legg et al. .................... 315/279

FOREIGN PATENT DOCUMENTS 58-64520 4/1983 Japan ............................ 323/301
2220088 12/1989 United Kingdom .......... G05F 5/04

Primary Examiner—William H. Beha, Jr.
Attorney, Agent, or Firm—Burns, Doane, Swecker & Mathis

[57] ABSTRACT

A system for providing a constant current to airport or airfield signs is disclosed. The system receives input currents of varying amperages which also supply, and allow dimming of, runway or taxiway lights. According to various exemplary embodiments of the present invention, a high power factor is achieved which provides greater cost efficient operation of the signs.

11 Claims, 4 Drawing Sheets

INPUT CURRENT RESPONSIVE, TAP CHANGING TRANSFORMER SYSTEM

BACKGROUND

The present invention generally relates to circuitry for supplying current to electrical devices. More specifically, the present invention relates to circuitry for supplying a constant current to airport signs so as to maintain a uniform brightness despite varying input currents.

Typically, airports or airfields have numerous electrical devices and systems which are used to guide airplanes and personnel through the increasingly complex maze of runways and taxiways. Such electrical devices include, for example, lighting systems which outline the runways and taxiways, as well as signs used to direct traffic or identify areas.

Airfield series circuits are usually provided with different brightness level amperage steps so that the brightness of the lights which outline the runways and taxiways can be adjusted to provide a dimming function. For example, taxiway edge light circuits may have a fixed intensity requiring 6.6 amperes or they may have three intensity steps at 6.6 amperes, 5.5 amperes, or 4.8 amperes. On the other hand, runway edge light circuits usually have five step settings of 6.6, 5.2, 4.1, 3.4, and 2.8 amperes. This allows the brightness of these various lights to be adjusted from the control tower as needed.

The difficulty with this arrangement is that the airfield signs are usually also driven by the same series circuitry that feeds current to the runway and taxiway lights. Since the FAA requires that the light output from airport signs remain at a constant level, even when the circuits to which they are attached change current levels, designers of airfield series circuits have been forced to adapt these circuits to provide this required functionality.

Conventionally constant brightness of airfield signs has been achieved by providing a transformer associated with each of the signs that saturates over a relatively large range of input current values and an associated constant current regulator. A problem with this solution is that it provides a resultant power factor of less than 0.5 which greatly reduces the cost efficiency of the system.

SUMMARY

The present invention overcomes these and other drawbacks of conventional circuitry by providing, among other features, a tapped current transformer which supplies current from its secondary coil to the sign. Sensing circuitry is also provided which detects changes in the input current that occur when adjustments to the brightness levels of the runway or taxiway lights are made from the control tower. Based on the sensed change, an appropriate tap is selected so that the output current to the sign lamps from the secondary coil of the tapped transformer remains constant.

Systems according to the present invention can be easily retrofit to existing airport lighting systems and are capable of operation in a broad temperature spectrum. An object of the present invention is to provide a wide load capability so that signs or other light fixtures can be operated which have one or a plurality of lamps. Another object of the present invention is to provide protection against overcurrent surges that could damage the sign lamps.

Systems and circuits according to the present invention provide, among other advantages, a high cost efficiency by maintaining a high power factor. Further, the constant value of the current through the lamps prevents flickering and allows the lamps to last a long time.

BRIEF DESCRIPTION OF THE DRAWINGS

These and other features, objects, and advantages of the present invention will become more readily apparent to those skilled in the art by reading the following detailed description in conjunction with the appended figure in which.

DETAILED DESCRIPTION

An exemplary embodiment of the present invention will now be described with reference to FIGS. 1-4. Initially, it should be noted that although the exemplary embodiment illustrated in FIGS. 1-4 and described below relates to a system wherein five predetermined input current magnitudes are contemplated, the present invention is not limited thereto. Those skilled in the art will appreciate that the exemplary embodiment of the present invention can be readily modified to provide a substantially constant output current amplitude or amplitudes for any number of different input current amperages.

Figure 1:
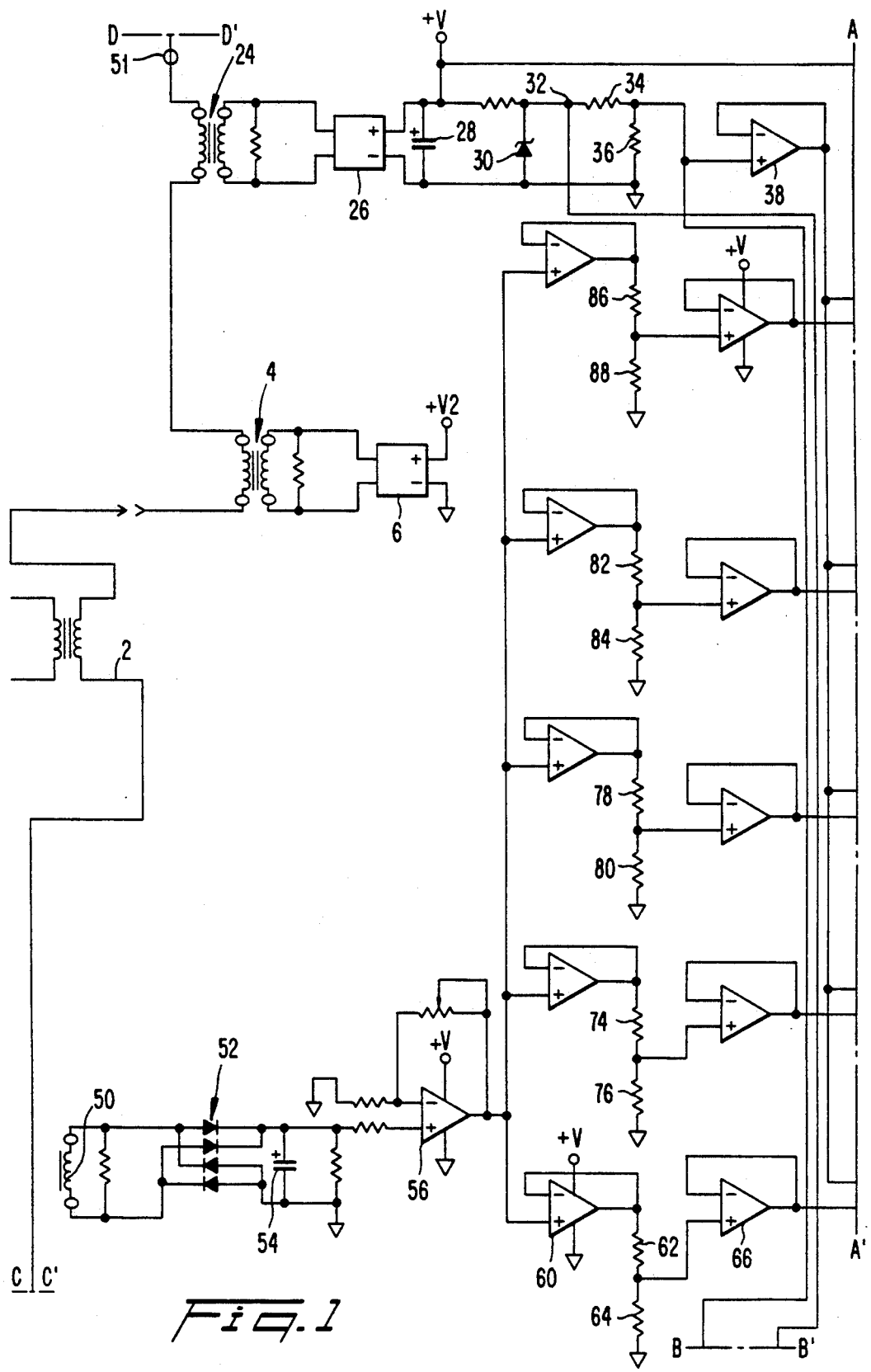
FIG. 1 is a first section of a circuit diagram illustrating an exemplary embodiment of a current supplying circuit according to the present invention.

With this in mind, in FIG. 1, isolation transformer 2 provides the circuit with power from the main airport or airfield series power line. The input current which, in this exemplary embodiment, may be any one of five predetermined amperages, flows through the primary winding of the power transformer and is rectified by the full wave rectifier 6 to supply a voltage denoted V2. This voltage is impressed across the primary coil of relay 10 which controls the power to the tapped transformer 8, for example, by becoming deenergized to short circuit the tapped transformer 8, as will be described in more detail below.

The tapped transformer 8 has five taps 12, 14, 16, 18, and 20 which each correspond to one of the five predetermined input amperages. As an example, the five predetermined input currents can have amperages of 2.8, 3.4, 4.1, 5.2, and 6.6, respectively. Thus, if an operator decides to dim the taxiway or runway lights and reduces the series line current to 2.8 amps, for example, tap 12 would be selected so that a constant current would be output on line 22.

If, on the other hand, an operator decided that maximum brightness was required, the series line current might be increased to 6.6 amps. In such a case, tap 20 would be selected to provide the same constant output current. Of course the constant output current can have any desired amperage, for example 6 amps, simply by selecting an appropriate tapped transformer. The way in which the exemplary circuit shown in FIGS. 1-4 selects an appropriate one of the taps 12-20 will now be discussed.

Power transformer 24 is an element which is used to provide a supply voltage to the circuit (generally denoted as +V) and to provide reference voltages to compare against for both selecting an appropriate tap and providing overcurrent protection. The current flowing from the secondary coil of power transformer 24 is rectified by the bridge 26. The current is filtered via capacitor 28 and a voltage is provided thereby across zener diode 30 which remains relatively constant regardless of the amperage of the input alternating current.

A first reference voltage is thus provided at node 32 which is used in the overcurrent protection circuit. Operation of the overcurrent protection circuit will be described in more detail below. The zener voltage is then divided by way of the voltage divider comprising resistors 34 and 36, with the resultant second reference voltage being buffered by the negatively fed-back amplifier 38 to isolate any variances in load impedance from the rest of the circuit. This second reference voltage is then input to the negative inputs of each of the amplifiers 40, 42, 44, 46, and 48, seen in FIG. 2, which are configured as comparators (in some instances, the second reference voltage is summed with a feedback signal and the sum is applied to the negative input as is more fully described below).

The input alternating current also flows through the current monitoring transformer 50 of FIG. 1. Note that this transformer 50 would, in practice, be disposed at the location denoted by reference numeral 51, but has been moved to simplify the circuit diagram. This transformer can, for example, be a toroidal transformer. The transformer 50 generates a signal representative of the input alternating circuit which is rectified at bridge 52, filtered by capacitor 54 and amplified to increase the signal by feedback amplifier 56.

As can be seen in FIG. 1, the output signal of amplifier 56 is fed to each of five branches which correspond to the five predetermined amperages of the input alternating current. For reasons that will become more evident, each of the comparators 40, 42, 44, 46, and 48 in FIG. 2 in the exemplary embodiment are connected to branches which correspond to input currents having increasingly higher amperages. Thus, the branch which includes comparator 40 corresponds to the lowest predetermined amperage while the branch including comparator 48 corresponds to the highest predetermined amperage.

The operation of the lowermost of these branches, as seen in the FIGS. 1-3, will be described in detail followed by a discussion identifying differences in operation of the other branches.

In a first branch, the output signal of feedback amplifier 56, which is proportional to the input alternating current, is buffered by amplifier 60. The buffered output is then divided by a voltage divider comprising resistors 62 and 64. This divided voltage signal is then buffered by amplifier 66, the output of which is applied to the positive input of amplifier 48 which is set up to function as a comparator. If the signal at the positive input of amplifier 48 is greater than the reference voltage signal at the negative input, then the amplifier outputs a high level logic signal. This will occur if the amperage of the input alternating current is equal to the predetermined amperage which corresponds to this branch, e.g., 6.6 amps.

In order for the amplifier 48 to output a high level logic signal for only the designed predetermined amperage, the values of the resistors 62 and 64 are selected so that the divided voltage will be greater than the reference voltage only at a current equal to or exceeding the predetermined amperage corresponding to this branch. When this occurs, the base of the transistor 68, seen in FIG. 2, will be biased so as to put the transistor in a conductive state.

Figure 3:
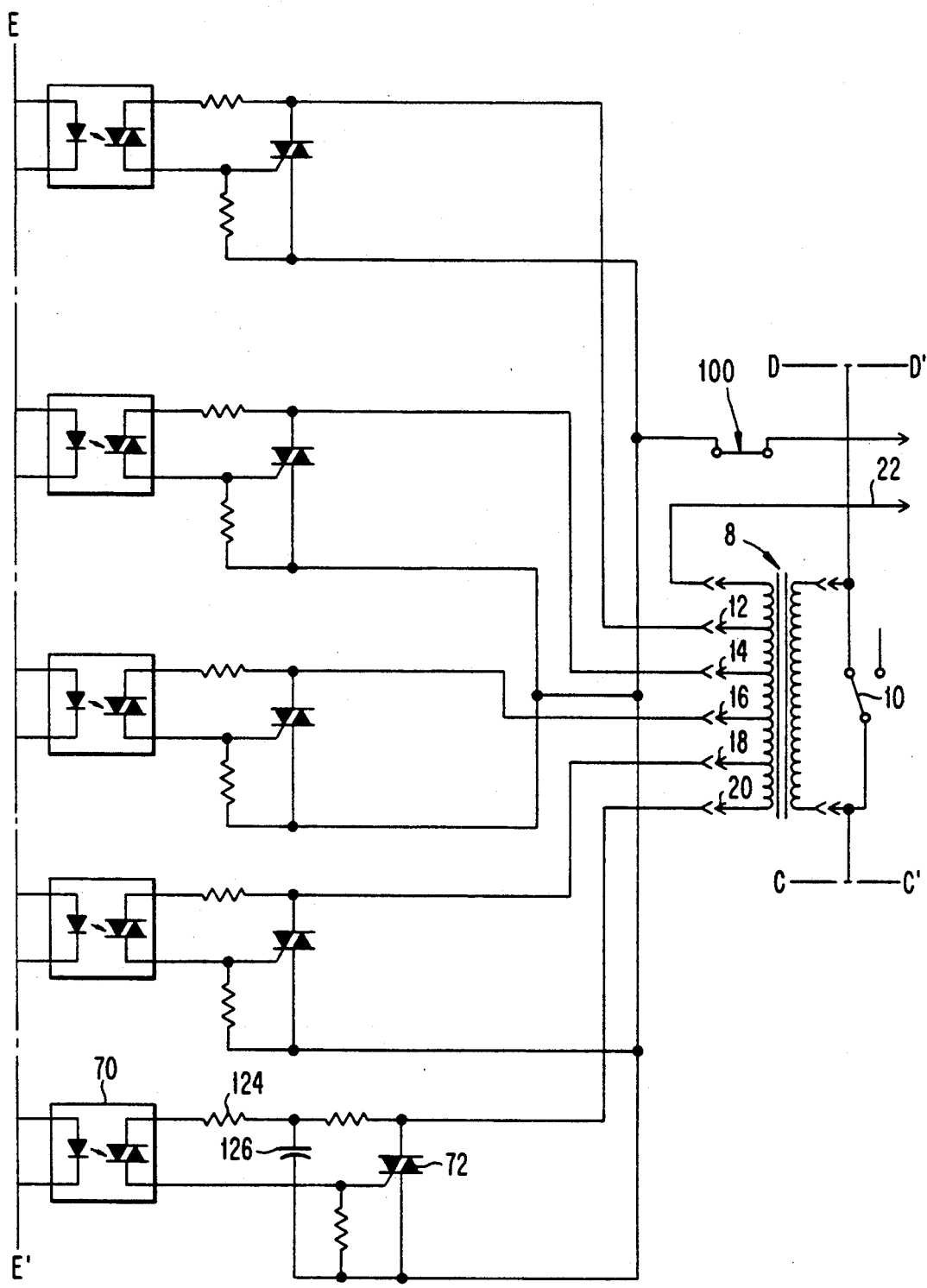
FIG. 3 is a third section of the circuit diagram of FIGS. 1 and 2 which is connected to FIG. 1 along the lines C—C' and D—D' and to FIG. 2 along the line E—E'.
Figure 4:
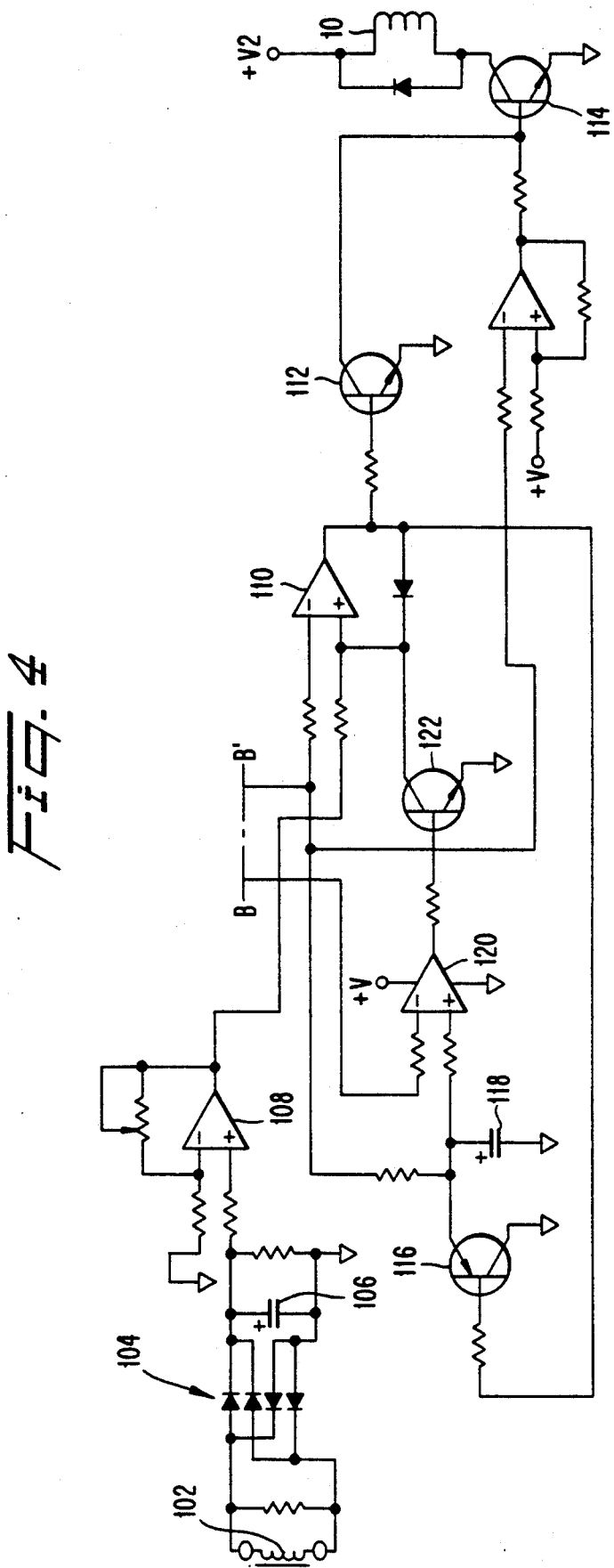
FIG. 4 is a fourth section of the circuit diagram of FIGS. 1-3 which is connected to FIG. 1 along the line B-B'.

This, in turn, actuates the optically-isolated triac 70, shown in FIG. 3, which serves to remove transients in the circuit which occur, for example, during changes in the input alternating current from one predetermined amperage to another. An output triac 72 is then turned on which selects tap 20 as the active tap for providing the output current on line 22.

Each of the other four branches function in a similar fashion and, therefore, are described below only with respect to differences from the above-described branch. Thus, the buffers which correspond to buffers 60 and 66, the transistors which correspond to transistor 68, the optically isolated triacs which correspond to 70 and the output triacs which correspond to 72, each function in the same manner as described above and have been left unnumbered to simplify the Figures.

Each of the branches does, however, have a different voltage divider to provide signals of the appropriate level so that the corresponding comparator will output a high level signal when the predetermined amperage corresponding to that branch is monitored by the transformer 50. Thus, each of the resistor pairs 62 and 64, 74 and 76, 78 and 80, 82 and 84, and 86 and 88 will have ohmic values which are selected so that each of the predetermined input amperages will trigger the comparator in the branch which is designed for that amperage, but will not trigger the comparator in the branch designed for the next highest amperage.

Since these resistor pairs 62 and 64, 74 and 76, 78 and 80, 82 and 84, and 86 and 88 are located in branches corresponding to decreasing predetermined amperages, the ratios of these pairs of resistors will also decrease, respectively. Thus, the ratio of the value of resistor 62 to resistor 64 will be greater than the ratio of resistor 74 to resistor 76, and so on.

The comparators 40, 42, 44, and 46 in the other branches also differ in that they have one or more additional input lines to the nodes (unnumbered) which receive the reference voltage and which are tied to the negative inputs of these comparators. These additional input lines 90-99 function to prevent more than one tap from being selected when an input current having other than the lowest predetermined amperage is input from the isolation transformer 2.

For example, if an input current having the highest of the predetermined amperages, e.g., 6.6 amps, is flowing through the circuit, the voltage levels presented at the positive inputs of all of the comparators will be higher than the reference voltage. Without these additional inputs 90-99, all of the comparators would then supply a high level logic signal.

Since, in this example, selection of only tap 20 corresponding to the highest predetermined input amperage is desired, input lines 90, 91, 93, and 96 are provided from the output of the amplifier 48 through a diode (unnumbered) to the nodes preceding the negative inputs of each of the amplifiers 46, 44, 42, and 40, respectively. In this way a signal higher than the reference voltage is applied to the negative inputs of each of these amplifiers so that only amplifier 48 outputs a high level logic signal and only tap 20 is selected. Naturally, transients can be created by these additional inputs during a transition period from one input amperage to another, however, the aforementioned optically isolated triacs provide a smooth transition to ensure a constant output current on line 22.

Figure 2:
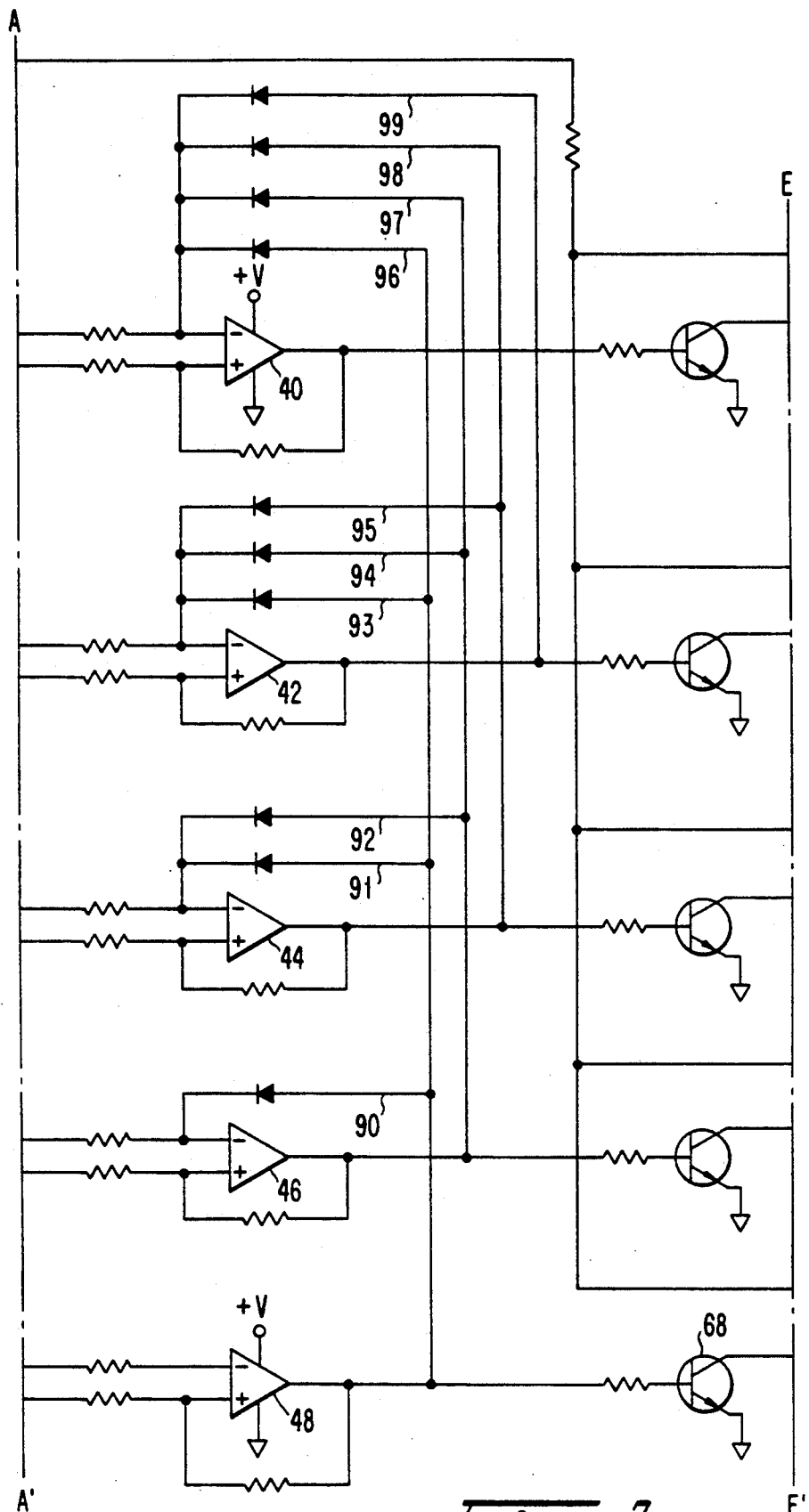
FIG. 2 is a second section of the circuit diagram of FIG. 1 which is connected thereto along the line A—A'.

To provide this same functionality for all of the different input amperages, each of the amplifiers 46, 44, and 42 have lines connected from their outputs to the inputs of the amplifiers corresponding to lower input amperages as can be seen in FIG. 2.

An overcurrent protection circuit is provided which measures the output current to the lamps in the signs by sensing the current through a current monitor transformer having a primary coil 100 and a secondary coil 102. The transformer coil 102, bridge rectifier 104, capacitor 106, and amplifier 108 seen in FIG. 4 function in the same manner as elements 52, 54, 56, and 58, respectively, described above with respect to the input current monitor of FIG. 1 and thus are not further described here.

The output signal of amplifier 108, which is proportional to the current passing through coil 100, is then applied to the positive input of amplifier 110 which is configured as a comparator. The first reference voltage taken from node 32 is applied to the negative input of amplifier 110. If the positive input is greater than the negative input, then the output current on line 22 is too high for safe operation of the lamps. This may occur, for example, while automatic tap selection is being performed or if there is an undesired transient introduced to the airfield lighting circuit. When this occurs, the output of amplifier 110 is a high level logic signal.

This high level logic signal is applied to the base of transistor 112, turning transistor 112 on. This in turn holds the base of transistor 114 low which deenergizes the relay 10 and shorts the circuit having the primary coil of the tapped transformer 8 so that the output current on line 22 is shut off. The output current is shut off only temporarily, by providing a time delay circuit which operates as follows.

If the output of amplifier 110 goes high, transistor 114 is turned off so that capacitor 118 begins charging. After the predetermined time period elapses, e.g., 250 milliseconds, the voltage applied to the positive input of amplifier 120 by the capacitor 118 will be higher than the reference voltage applied to the negative input of amplifier 120. Thus, the amplifier 120, which is configured as a comparator, will output a high level logic signal which turns transistor 122 on. This draws the positive input of amplifier 110 low again, which turns off transistor 112, turns on transistor 114 and reenergizes the relay 10 allowing the output current to flow again on line 22.

As mentioned previously, although the present invention has been described in terms of an exemplary embodiment wherein five predetermined amperages can be input, the present invention encompasses any number of predetermined input amperages. For example, three predetermined input amperages of 4.1, 5.2, and 6.6 could be used. Moreover, other modifications and changes are intended to be within the scope of the present invention as well. For example, a snubber could be provided after one or more of the optically isolated triacs should inductance spikes from the tapped transformer 8 tend to turn these optically isolated triacs on erroneously. One such snubber, comprising a resistor 124 and a capacitor 126 shown in FIG. 3, has been placed in the branch described in detail above as an example of such a modification.

Accordingly, while the present invention has been described with respect to the foregoing exemplary embodiments, these embodiments are intended to be in all respects illustrative rather than limitive or restrictive of the present invention. Any and all modifications or changes which are within the spirit and scope of the present invention as embodied by the appended claims are intended to be encompassed thereby.

What is claimed is:

1. A system for providing a constant output current to lamps in signs and which receives an input current which can vary in amperage comprising:
    an input line for receiving said input current, wherein said input current has one of a plurality of amperages;
    a current monitoring transformer which monitors said input current and which generates a voltage which is proportional to said input current;
    a reference voltage generator for generating a reference voltage;
    a plurality of voltage dividers for transforming said voltage into a plurality of different voltages;
    a plurality of comparators, each of which receives one of said plurality of different voltages at a first input, said reference voltage at a second input and outputs a high level logic signal if said first input is greater in magnitude than said second input; and
    a tapped transformer having a plurality of taps, wherein one of said plurality of taps is selected in response to said high level logic signal, for outputting said constant output current to said lamps.

2. A system comprising:
    means for receiving an input alternating current having one of a plurality of amperages;
    means, responsive to said means for receiving, for detecting said one amperage and generating a plurality of different voltage levels proportional to of said one amperage;
    means for generating a reference voltage;
    means for comparing said voltage levels and said reference voltage;
    means for selecting a tap of a transformer having a plurality of taps based on a result of said means for comparing; and
    means for outputting an output current, in response to said selected tap, which has a substantially constant amperage even if said one amperage of said input alternating current changes to another of said plurality of amperages.

3. The system of claim 1 further comprising:
    means for temporarily shutting off said output current if said one amperage is greater than a predetermined value.

4. The system of claim 1, wherein said means for detecting and generating further comprises:
    means for generating a first voltage level representative of said one amperage;
    a plurality of circuit branches, each corresponding to one of said plurality of amperages, for receiving said first voltage level; and
    a plurality of voltage dividing means, each disposed in one of said plurality of circuit branches, for dividing said first voltage level to generate said plurality of different voltage levels.

5. The system of claim 3, wherein said means for generating a first voltage level comprises a toroidal transformer.

6. The system of claim 1, wherein said means for comparing further comprises:
   a plurality of comparators, each of which corresponds to one of said plurality of amperages.

7. The system of claim 5, wherein said reference voltage and one of said plurality of different voltage levels comprise first and second inputs, respectively, to each of said plurality of comparators.

8. The system of claim 5, wherein said means for selecting further comprises:
   means for allowing only one of said plurality of comparators to output a high level logic signal for each of said plurality of amperages.

9. The system of claim 7, wherein said means for allowing further comprises:
   a feedback loop which connects an output of said plurality of comparators to an input of each of said plurality of comparators which corresponds to a lesser one of said plurality of amperages.

10. The system of claim 3, wherein said means for temporarily shutting off said output current further comprises:
    means for generating a voltage corresponding to said output current;
    second means for comparing said voltage to a second reference voltage generated by said reference voltage generating means; and
    means for switching off said output current if said voltage is greater than said second reference voltage.

11. The system of claim 9, further comprising:
    means for switching said output current back on after a predetermined time has elapsed since said output current was switched off.

* * * * *